United States Patent
Aoki

(10) Patent No.: US 8,886,978 B2
(45) Date of Patent: Nov. 11, 2014

(54) MULTIPROCESSOR SYSTEM AND CONTROL METHOD WHERE A POWER SAVING MODE CONTROL THAT SAFELY STOPS/STARTS ACCESSES TO A SHARED MEMORY

(75) Inventor: Hitoshi Aoki, Urayasu (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/617,938

(22) Filed: Sep. 14, 2012

(65) Prior Publication Data

US 2013/0013944 A1    Jan. 10, 2013

Related U.S. Application Data

(63) Continuation of application No. 12/565,429, filed on Sep. 23, 2009, now Pat. No. 8,301,923.

(30) Foreign Application Priority Data

Sep. 26, 2008  (JP) .................................. 2008-249133

(51) Int. Cl.
  *G06F 1/32*  (2006.01)
  *G06F 1/00*  (2006.01)
  *G06F 12/00*  (2006.01)

(52) U.S. Cl.
  CPC ........... *G06F 1/3203* (2013.01); *Y02B 60/1225* (2013.01); *G06F 1/3275* (2013.01)
  USPC ............................. 713/320; 713/323; 711/100

(58) Field of Classification Search
  USPC ....................................................... 713/320
  See application file for complete search history.

(56) References Cited

U.S. PATENT DOCUMENTS

| | | | | |
|---|---|---|---|---|
| 5,056,000 A | * | 10/1991 | Chang | 710/110 |
| 5,167,024 A | | 11/1992 | Smith et al. | |
| 5,845,322 A | * | 12/1998 | Leung | 711/151 |
| 6,535,945 B1 | * | 3/2003 | Tobin et al. | 710/305 |
| 6,920,572 B2 | | 7/2005 | Nguyen et al. | |

(Continued)

FOREIGN PATENT DOCUMENTS

| | | |
|---|---|---|
| EP | 1 035 499 A2 | 9/2000 |
| JP | 11-110363 A | 4/1999 |

(Continued)

OTHER PUBLICATIONS

Kanzo Noda, Multiprocessor System, Apr. 23, 1999, pp. 2, English translation of abstract of JP11110363A in a OA issued in parent U.S. Appl. No. 12/565,429.

(Continued)

*Primary Examiner* — Suresh Suryawanshi
(74) *Attorney, Agent, or Firm* — Rossi, Kimms & McDowell LLP

(57) ABSTRACT

A multiprocessor system configured to share processes by a main system having a first processor and a subsystem having a second processor, comprises a first shared memory configured to receive accesses from the main system and the subsystem, a second memory configured to receive access from the subsystem at a power saving mode, a stop unit configured to stop accesses from the main system and the subsystem to the first shared memory when the subsystem enters the power saving mode, and a switching unit configured to switch an access destination of the subsystem from the first shared memory to the second memory when the subsystem enters the power saving mode.

24 Claims, 10 Drawing Sheets

(56) References Cited

U.S. PATENT DOCUMENTS

| | | | |
|---|---|---|---|
| 6,926,380 B2 * | 8/2005 | Narazaki et al. | 347/5 |
| 7,058,829 B2 * | 6/2006 | Hamilton | 713/320 |
| 7,185,174 B2 * | 2/2007 | Stewart et al. | 712/11 |
| 7,424,630 B2 * | 9/2008 | Horvath | 713/300 |
| 7,555,662 B2 | 6/2009 | Kidoguchi | |
| 7,587,619 B2 | 9/2009 | Ryan | |
| 7,734,936 B2 * | 6/2010 | Hamilton | 713/300 |
| 7,853,814 B2 * | 12/2010 | Oyanagi | 713/323 |
| 8,301,916 B2 * | 10/2012 | Hamilton | 713/300 |
| 2006/0259800 A1 * | 11/2006 | Maejima | 713/300 |
| 2008/0276053 A1 | 11/2008 | Lee | |
| 2011/0060929 A1 | 3/2011 | Park et al. | |

FOREIGN PATENT DOCUMENTS

| | | |
|---|---|---|
| JP | 2000-105639 A | 4/2000 |
| JP | 2003089254 A | 3/2003 |
| JP | 2005-111715 A | 4/2005 |
| JP | 2005346672 A | 12/2005 |
| JP | 2006221381 A | 8/2006 |
| JP | 2006259906 A | 9/2006 |
| JP | 2007-214898 A | 8/2007 |

OTHER PUBLICATIONS

Japanese Office Action for corresponding JP2012-203535, mail date Feb. 21, 2014.

* cited by examiner

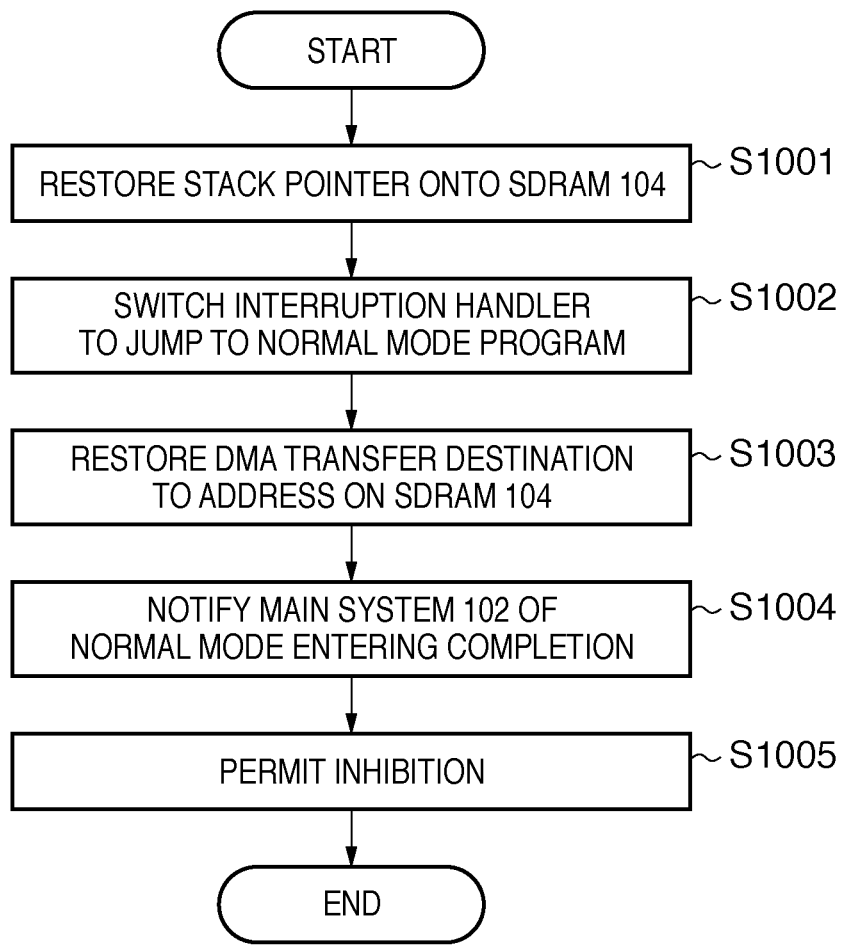

MULTIPROCESSOR SYSTEM AND CONTROL METHOD WHERE A POWER SAVING MODE CONTROL THAT SAFELY STOPS/STARTS ACCESSES TO A SHARED MEMORY

CROSS-REFERENCE TO RELATED APPLICATIONS

This is a continuation of and claims benefit to U.S. patent application Ser. No. 12/565,429, filed Sep. 23, 2009, now U.S. Pat. No. 8,301,923, the content of which is incorporated herein by reference. These applications claim priority to JP Application No. 2008-249133, filed Sep. 26, 2008, the content of which is also incorporated herein by reference.

BACKGROUND OF THE INVENTION

1. Field of the Invention

The present invention relates to a multiprocessor system and a control method thereof, and a computer-readable medium.

2. Description of the Related Art

In recent years, various information processing apparatuses are required to attain power savings. Hence, in order to reduce consumption power of apparatuses, those having a power saving mode in which consumption power is reduced compared to a normal mode in addition to the normal mode in which normal application processing is executed are increasing.

Various operations are made at a power saving mode. In general, operation voltages of some circuits and devices which configure an apparatus are lowered or a power supply to them is stopped, thus reducing consumption power. In this way, when some functions of the apparatus are not used or at a standby mode, the apparatus is set in the power saving mode, thereby effectively reducing consumption power.

As a technique for reducing consumption power at a power saving mode, a technique which executes a program allocated on an SRAM which requires a low operation voltage at a power saving mode to set other memories in the power saving state has been proposed (see Japanese Patent Laid-Open Nos. 2000-105639 and 2005-111715).

In these proposed techniques, programs and data allocated on an SDRAM are used and executed at the normal mode. At the power saving mode, the SDRAM is not accessed, and a program for the power saving mode is executed using only the program and data allocated on an SRAM that requires a lower operation voltage than the SDRAM. As a result, since the SDRAM can be set in a power saving state like a self refresh mode, consumption power at the power saving mode can be reduced.

On the other hand, in various embedded apparatuses and PCs, multiprocessor/multicore systems which incorporate a plurality of processors or a plurality of cores are increasing recently, and this trend is considered to accelerate in the future. In such multiprocessor/multicore systems as well, power savings are required.

SUMMARY OF THE INVENTION

In a multiprocessor/multicore system having a shared memory, a plurality of processors/cores access the shared memory. For this reason, when the shared memory is to be set in a power saving state at the power saving mode, after accesses from all the processors/cores are stopped upon entering the power saving mode, the shared memory has to be set in the power saving state. If a processor/core which does not stop to access the shared memory still remains, an unauthorized access and data inconsistency with respect to the shared memory occur, and the system may cease to normally operate or abort.

Furthermore, upon recovering from the power saving mode to a normal mode, after the shared memory is set in a normal state, the processors/cores have to start accesses to the shared memory.

Hence, upon entering the power saving mode or recovering to the normal mode in the multiprocessor/multicore system, power saving mode control that safely stops/starts accesses to the shared memory is demanded.

According to one aspect of exemplary embodiments of the present invention, the present invention relates to a multiprocessor system configured to share processes by a main system having a first processor and a subsystem having a second processor, comprising a first shared memory configured to receive accesses from the main system and the subsystem, a second memory configured to receive access from the subsystem at a power saving mode, a stop unit configured to stop accesses from the main system and the subsystem to the first shared memory when the subsystem enters the power saving mode, and a switching unit configured to switch an access destination of the subsystem from the first shared memory to the second memory when the subsystem enters the power saving mode.

Further features of the present invention will become apparent from the following description of exemplary embodiments with reference to the attached drawings.

BRIEF DESCRIPTION OF THE DRAWINGS

FIG. 10 is a flowchart showing an example of the operation of a recovery task of the subsystem 103 according to the second embodiment of the present invention.

DESCRIPTION OF THE EMBODIMENTS

First Embodiment

Figure 1:
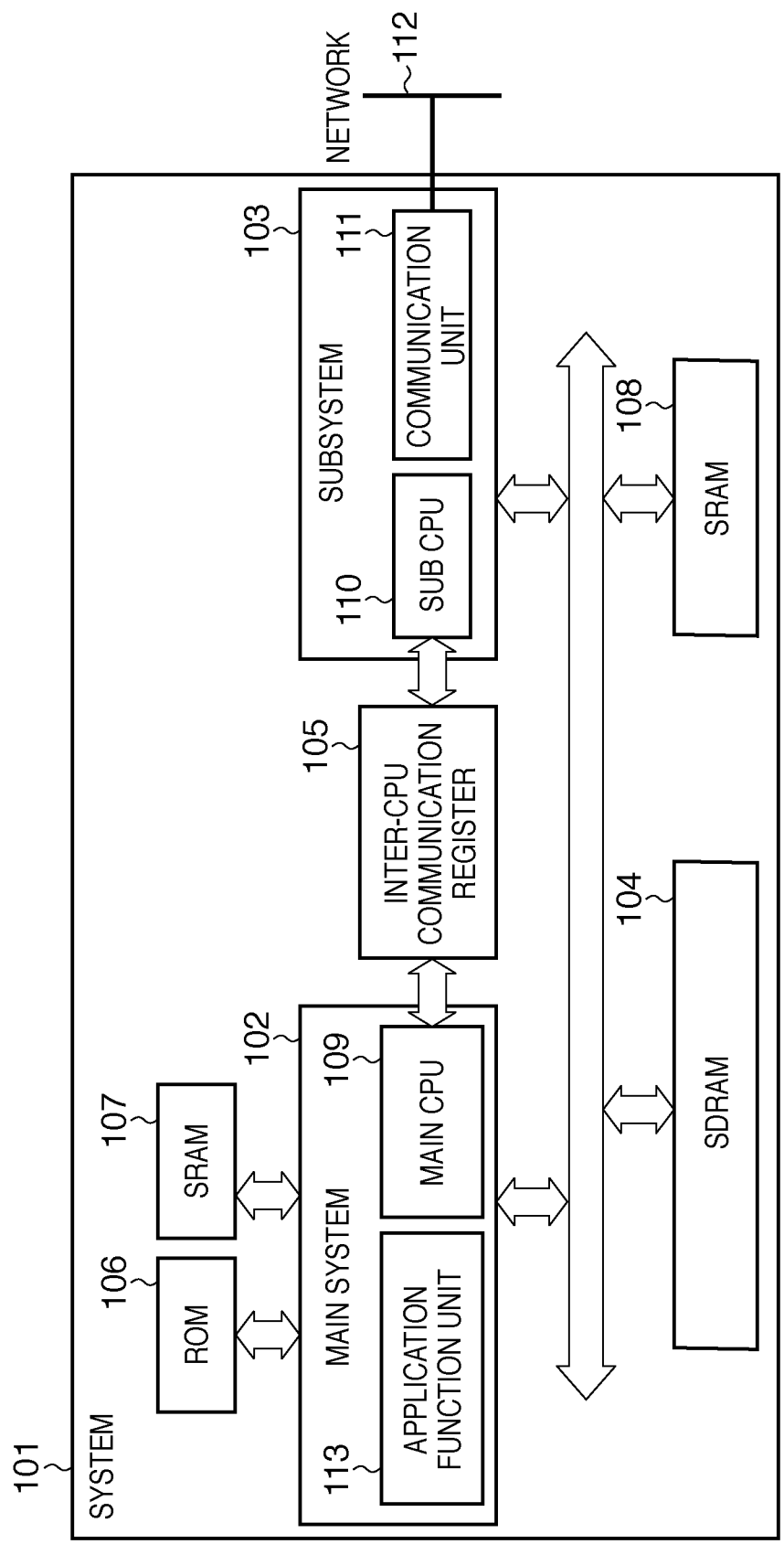
FIG. 1 is a block diagram showing an example of the arrangement of a system according to the first embodiment of the present invention.

FIG. 1 is a block diagram showing the arrangement of a multiprocessor system according to the first embodiment of the present invention. Referring to FIG. 1, a multiprocessor (multicore) system 101 includes a main system 102, subsystem 103, SDRAM 104, inter-CPU communication register 105, ROM 106, SRAM 107, and SRAM 108.

The main system 102 has a main CPU 109 and application function unit 113. The application function unit 113 is a hardware device controlled by the main CPU 109 so as to implement an application function.

For example, when the multiprocessor system 101 is a printing apparatus, a print function is implemented as the application function, and a printer engine or the like corresponds to the application function unit 113. When the main CPU 109 controls the application function unit 113 by executing a normal mode program allocated on the SDRAM 104, the main system 102 implements the application function at the normal mode.

The subsystem 103 includes a sub CPU 110 and communication unit 111. When the sub CPU 110 controls the communication unit 111 by executing a normal mode program allocated on the SDRAM 104, the communication unit 111 can communicate with other apparatuses on a network 112.

The SDRAM 104 is a first shared memory which can be accessed from the main system 102 and subsystem 103. The SDRAM 104 has a normal state in which it is accessible from the main system 102 and subsystem 103, and a power saving state in which it cannot be accessed but consumption power is reduced. When the multiprocessor system 101 is at a normal mode as a first mode, the SDRAM 104 receives a normal power supply and assumes the normal state. When the multiprocessor system 101 is at a power saving mode as a second mode, the SDRAM 104 assumes the power saving state. The main system 102 executes state transition control of the SDRAM 104 from a normal operation state to a power saving operation state and vise versa.

The power saving state of the SDRAM 104 may be either a self refresh mode or a non-power supply state. In the following description, the power saving state of the SDRAM 104 will be explained as a self refresh mode. On the SDRAM 104, the normal mode programs and data for the main system 102 and subsystem 103 are allocated.

The inter-CPU communication register 105 relays inter-CPU communications between the main CPU 109 and sub CPU 110. When one CPU writes a predetermined command in the inter-CPU communication register 105, an interruption is generated in the other CPU, which can load the predetermined command. The main system 102 and subsystem 103 communicate with each other via the inter-CPU communication register 105.

The ROM 106 is a memory which is accessible from the main system 102. The ROM 106 stores programs and data of the main system 102 and subsystem 103, which are mapped and executed on the SDRAM 104, SRAM 107, and SRAM 108 at a startup timing.

The SRAM 107 is a memory which is accessible from the main system 102. On the SRAM 107, a power saving mode program and data of the main system 102 are allocated. The SRAM 108 is a second shared memory which is accessible from the main system 102 and subsystem 103. On the SRAM 108, an interruption vector and interruption handler, and power saving mode program and data of the subsystem 103 are allocated.

The processing at the startup timing of the multiprocessor system 101 will be described first. The main system 102 executes a program allocated on the ROM 106 first. Upon starting the execution, the main CPU 109 maps the normal mode programs and data of the main system 102 and subsystem 103 allocated on the ROM 106 onto the SDRAM 104. Then, the main CPU 109 maps the power saving mode program of the main system 102 onto the SRAM 107 and that of the subsystem 103 onto the SRAM 108.

After that, the main system 102 starts execution of the program allocated on the SDRAM 104 to launch the subsystem. After the subsystem 103 is launched, it refers to a reset vector in a vector table allocated on the SRAM 108 and jumps to the normal mode program allocated on the SDRAM 104.

When the subsystem 103 starts execution of the normal mode program, it notifies the main system 102 of start of execution via the inter-CPU communication register 105. Upon completion of these processes, the main system 102 and subsystem 103 start the normal mode programs, and the multiprocessor system 101 executes processing at the normal mode.

When the multiprocessor system 101 is at the normal mode, the main system 102 and subsystem 103 execute the normal mode programs allocated on the SDRAM 104. The main system 102 implements the application function. The normal mode program of the subsystem 103 includes an embedded OS, a plurality of normal mode tasks, and normal mode interruption program. The embedded OS decides a task to be executed from the plurality of normal mode tasks, and the subsystem 103 executes processing when the embedded OS switches tasks to be executed.

When an interruption is generated in the subsystem 103, the interruption handler on the SRAM 108 controls to jump to a normal mode interruption program on the SDRAM 104, thus executing processing for the interruption. Interruptions to the subsystem 103 are generated from the inter-CPU communication register 105 and communication unit 111.

A DMA transfer destination of the communication unit 111 uses an area on the SDRAM 104 at the normal mode. A stack pointer used when the sub CPU 110 executes a program at the normal mode uses an area on the SDRAM 104.

In the first embodiment of the present invention, the multiprocessor system 101 enters the power saving mode in response to an instruction from the main system 102. Conditions required to enter the power saving mode include an elapse of a predetermined period of time after the operation of the application function stops, a user's instruction, and the like. When the multiprocessor system 101 is at the power saving mode, the subsystem 103 controls the communication unit 111 to operate. When the communication unit 111 receives a predetermined packet from the network 112, the multiprocessor system 101 recovers from the power saving mode to the normal mode.

An entering method of the multiprocessor system 101 from the normal mode to the power saving mode, and a recovery method of the multiprocessor system 101 from the power saving mode to the normal mode will be described below.

Figure 2:
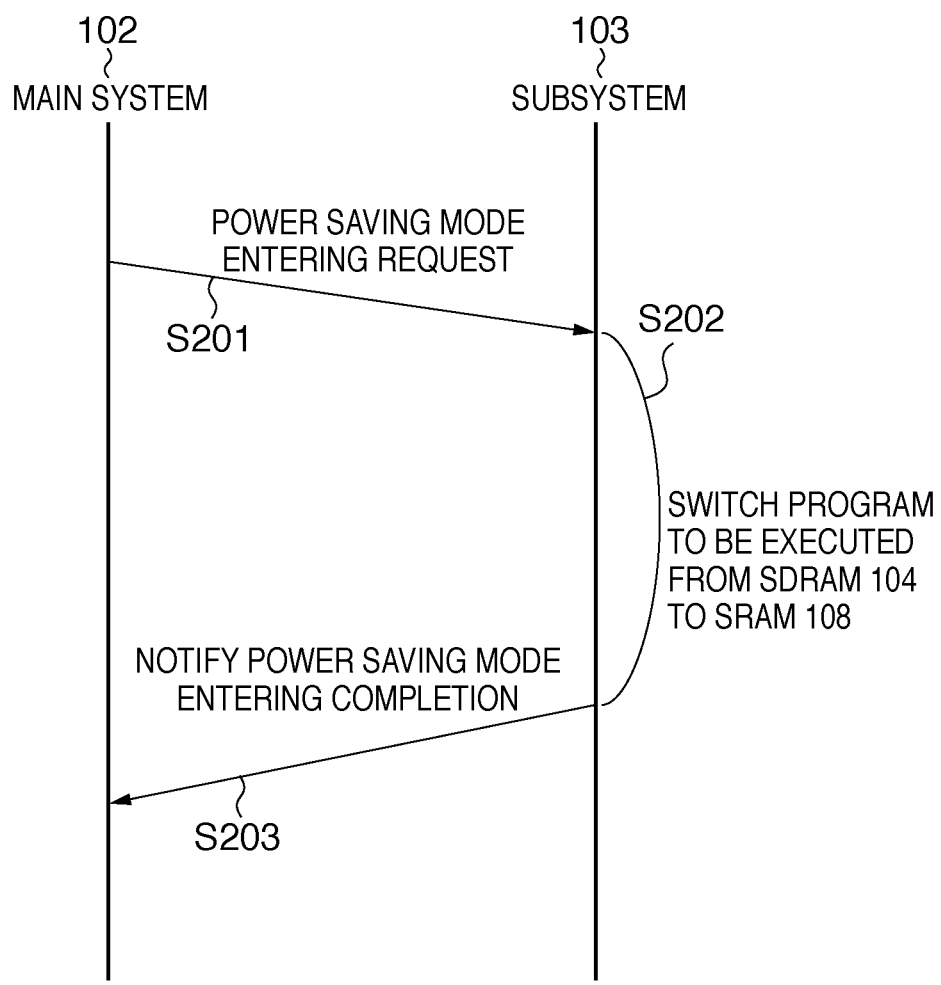
FIG. 2 is a sequence chart showing an example of the operations of a main system 102 and subsystem 103 upon entering a power saving mode according to the first embodiment of the present invention.

The entering method from the normal mode into the power saving mode will be described first. The sequence chart of FIG. 2 shows exchanges of processes between the main system 102 and subsystem 103 when the multiprocessor system 101 enters the power saving mode from the normal mode. Communications between the main system 102 and subsystem 103 are made using the inter-CPU communication register 105. When the multiprocessor system 101 enters the power saving mode from the normal mode, the main system 102 transmits a power saving mode entering request to the subsystem 103 in step S201.

Upon reception of the power saving mode entering request, the subsystem 103 stops an access to the SDRAM 104, and starts execution of the power saving mode program allocated on the SRAM 108 in step S202. After the subsystem 103 starts execution of the power saving mode program, it notifies the main system 102 of a power saving mode entering completion message as a response to the power saving mode entering request in step S203.

Figure 3:
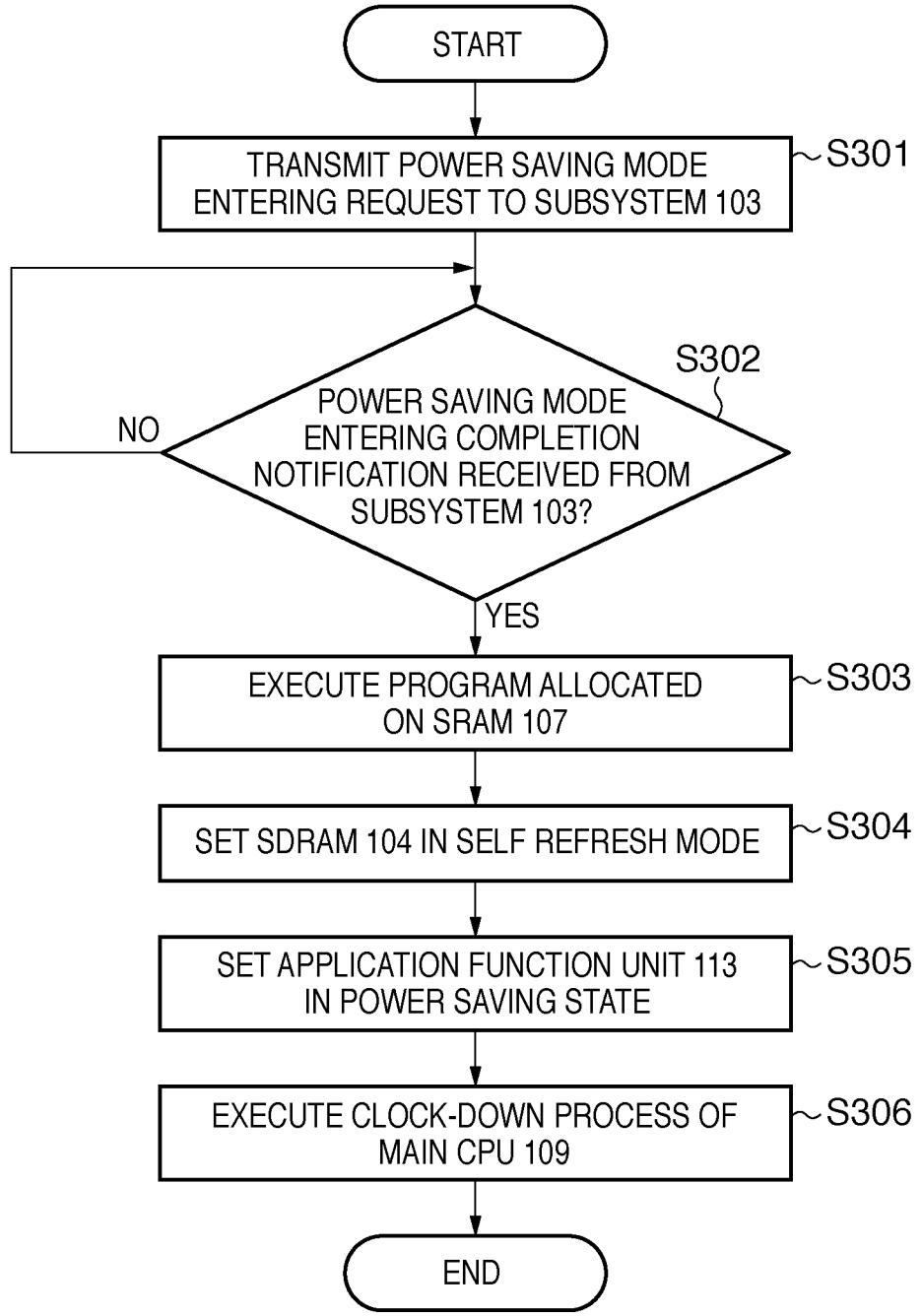
FIG. 3 is a flowchart showing an example of the operation of the main system 102 upon entering the power saving mode according to the first embodiment of the present invention.

The processes of the main system 102 and subsystem 103 at that time will be described in detail below. FIG. 3 is a flowchart executed when the main system 102 enters the power saving mode. As a program required to enter the power saving mode shown in FIG. 3, steps S301 to S303 are allocated on the SDRAM 104, and steps S304 to S306 are allocated on the SRAM 107.

In step S301, the main system 102 transmits a power saving mode entering request to the subsystem 103 via the inter-CPU communication register 105. After that, the main system 102 waits for a power saving mode entering completion notification message from the subsystem 103 in step S302. The main system 102 receives the power saving mode entering completion notification message from the subsystem 103 via the inter-CPU communication register 105.

After reception, the main system 102 jumps from the program allocated on the SDRAM 104 to that allocated on the SRAM 107 in step S303 so as to control the SDRAM 104 to operate in the self refresh mode. Since the main system 102 and subsystem 103 do not access the SDRAM 104 from then on, the main system 102 executes memory control to set the SDRAM 104 in the self refresh mode in step S304. In order to further reduce consumption power, the main system 102 sets the application function unit in a power saving state in step S305, and executes a clock-down process of the main CPU 109 in step S306. Upon completion of the aforementioned power saving mode entering processes, the main system 102 starts execution of the power saving mode program, and is set in the power saving mode.

Figure 4:
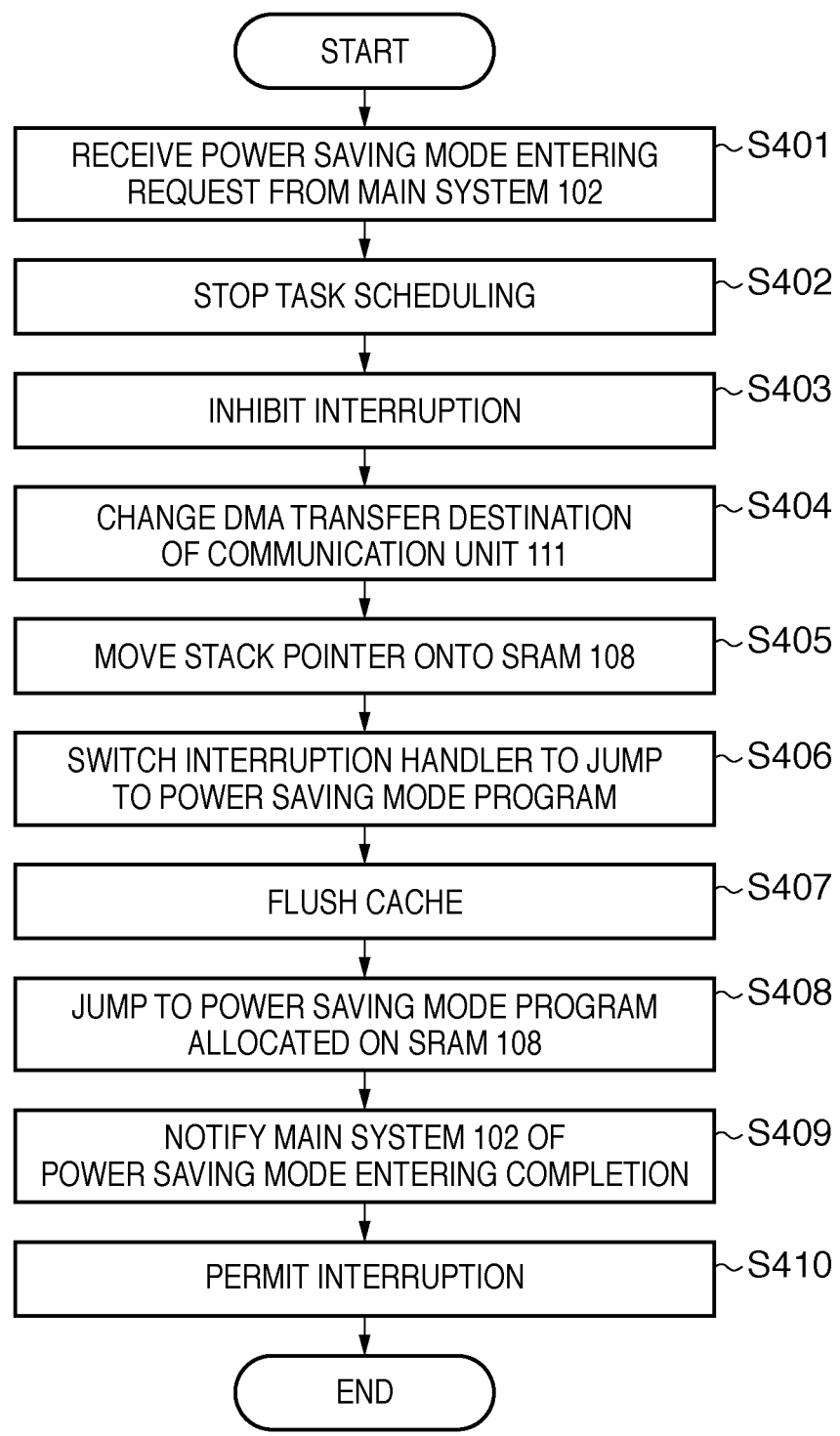
FIG. 4 is a flowchart showing an example of the operation of the subsystem 103 upon entering the power saving mode according to the first embodiment of the present invention.

The flowchart of FIG. 4 shows the operation after the subsystem 103 receives the power saving mode entering request until it notifies completion of power saving mode entering processing. Processes of steps S401 to S408 shown in FIG. 4 are allocated on the SDRAM 104 and those of steps S409 and S410 are allocated on the SRAM 108. These processes are executed by a switching task including the program allocated on the SDRAM 104 and that allocated on the SRAM 108.

The subsystem 103 receives the power saving mode entering request via the inter-CPU communication register 105 in step S401. In order to inhibit accesses to the SDRAM 104 at the power saving mode, the subsystem 103 executes processes for stopping accesses to the SDRAM 104 in steps S402 to S407, and then executes the program allocated on the SRAM 108.

In step S402, the subsystem 103 inhibits tasks allocated on the SDRAM 104 from being dispatched at the power saving mode. The subsystem 103 inhibits tasks allocated on the SDRAM 104 from being executed by stopping a task scheduling function of the embedded OS or sufficiently raising priority of the switching task. Furthermore, the subsystem 103 also inhibits interruptions in step S403.

In step S404, the subsystem 103 changes a DMA transfer destination of the communication unit 111 from the area on the SDRAM 104 to that on the SRAM 108. At this time, the subsystem 103 temporarily stops DMA transfer of the communication unit 111 as needed. When packets to be transmitted remain in the communication unit 111, since information is old if the packets are transmitted after processing at the normal mode is restarted, the subsystem 103 cancels the packets to be transmitted.

In step S405, the subsystem 103 changes a stack pointer. In order to restore an original stack pointer position upon recovering to the normal mode, the subsystem 103 saves the current stack pointer on the SDRAM 104. Then, the subsystem 103 moves the stack pointer to a predetermined address on the SRAM 108. In this way, switching control of the access destination of the subsystem 103 from the SDRAM 104 to the SRAM 108 can be implemented.

In step S406, the subsystem 103 controls the interruption handler associated with the inter-CPU communication register 105 and communication unit 111 to jump to the power saving mode program so as not to access the SDRAM 104. If data on a cache of the sub CPU 110 is not written on the SDRAM 104 before an access to the SDRAM 104 is disabled, data inconsistency may occur upon recovering to the normal mode. Thus, the subsystem 103 flushes the cache in step S407 and waits enough until the cache is flushed.

In step S408, the subsystem 103 starts execution of the power saving mode program by jumping to the power saving mode program allocated on the SRAM 108 or calling a function allocated on the SRAM 108. In this way, the subsystem 103 stops an access to the SDRAM 104.

After the processes until step S408, the subsystem 103 notifies the main system 102 of a power saving mode entering completion message via the inter-CPU communication register 105 in step S409. Finally, the subsystem 103 permits interruptions of the inter-CPU communication register 105 and communication unit 111 in step S410. Thus, the communication unit 111 is allowed to receive packets again. When DMA transfer is temporarily stopped in step S404, the subsystem 103 restarts DMA transfer of the communication unit 111 in this step.

By executing these processes, the subsystem 103 can enter the power saving mode. In the subsequent processing at the power saving mode, the subsystem 103 continues processing using the switching task.

The operations of the main system 102 and subsystem 103 at the power saving mode according to the first embodiment of the present invention will be described below. The main system 102 waits until receiving the request of recovery to the normal mode from the subsystem 103.

On the other hand, the subsystem 103 receives, using the communication unit 111, packets from another external apparatus via the network 112. The subsystem 103 continuously receives packets until it receives a predetermined packet. Upon reception of the predetermined packet, the subsystem 103 starts recovery processing to the normal mode.

The processing executed when the multiprocessor system 101 recovers from the power saving mode to the normal mode will be described below.

Figure 5:
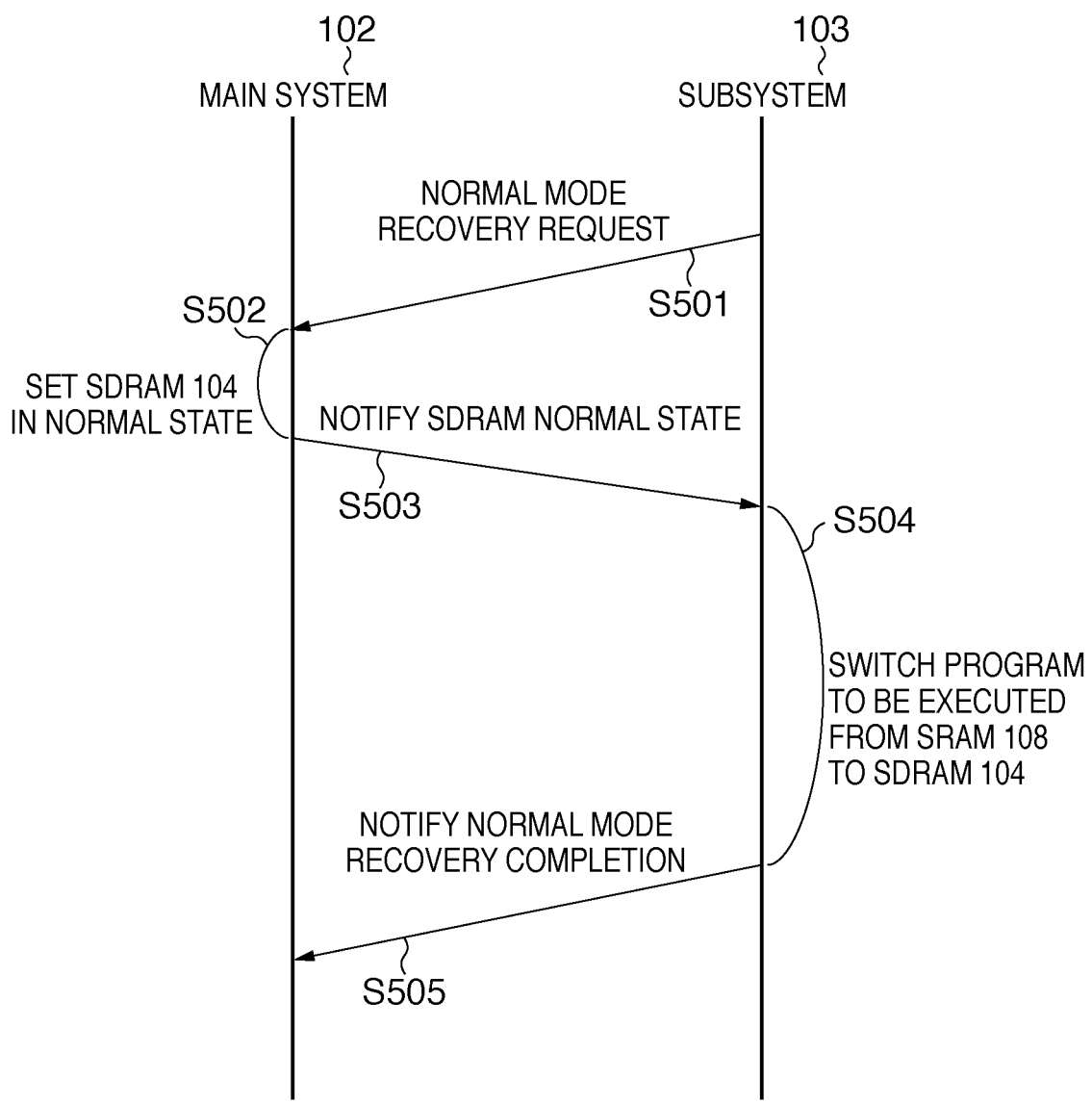
FIG. 5 is a sequence chart showing an example of the operations of the main system 102 and subsystem 103 upon recovering to a normal mode according to the first embodiment of the present invention.

FIG. 5 shows the sequences of the main system 102 and subsystem 103 when the multiprocessor system 101 recovers from the power saving mode to the normal mode. Communications between the main system 102 and subsystem 103 are made via the inter-CPU communication register 105.

At the power saving mode, the subsystem 103 determines whether or not to recover to the normal mode. Upon reception of a predetermined packet as a recovery condition to the normal mode, the subsystem 103 transmits a normal mode recovery request to the main system 102 in step S501.

Upon reception of the normal mode recovery request, the main system 102 sets the SDRAM 104 in the normal state in step S502. By setting the SDRAM 104 in the normal state, data stored in the SDRAM 104 can be accessed.

After the SDRAM 104 is set in an accessible state, the main system 102 notifies the subsystem 103 that the SDRAM 104 is set in the normal state in step S503. Upon reception of the notification indicating that the SDRAM 104 is set in the normal state, the subsystem 103 switches a program to be executed from that on the SRAM 108 to the normal mode program allocated on the SDRAM 104 in step S504.

Upon completion of the normal mode entering processing, the subsystem 103 notifies the main system 102 of a normal mode entering completion message in step S505, and the multiprocessor system 101 completes recovery to the normal mode.

Figure 6:
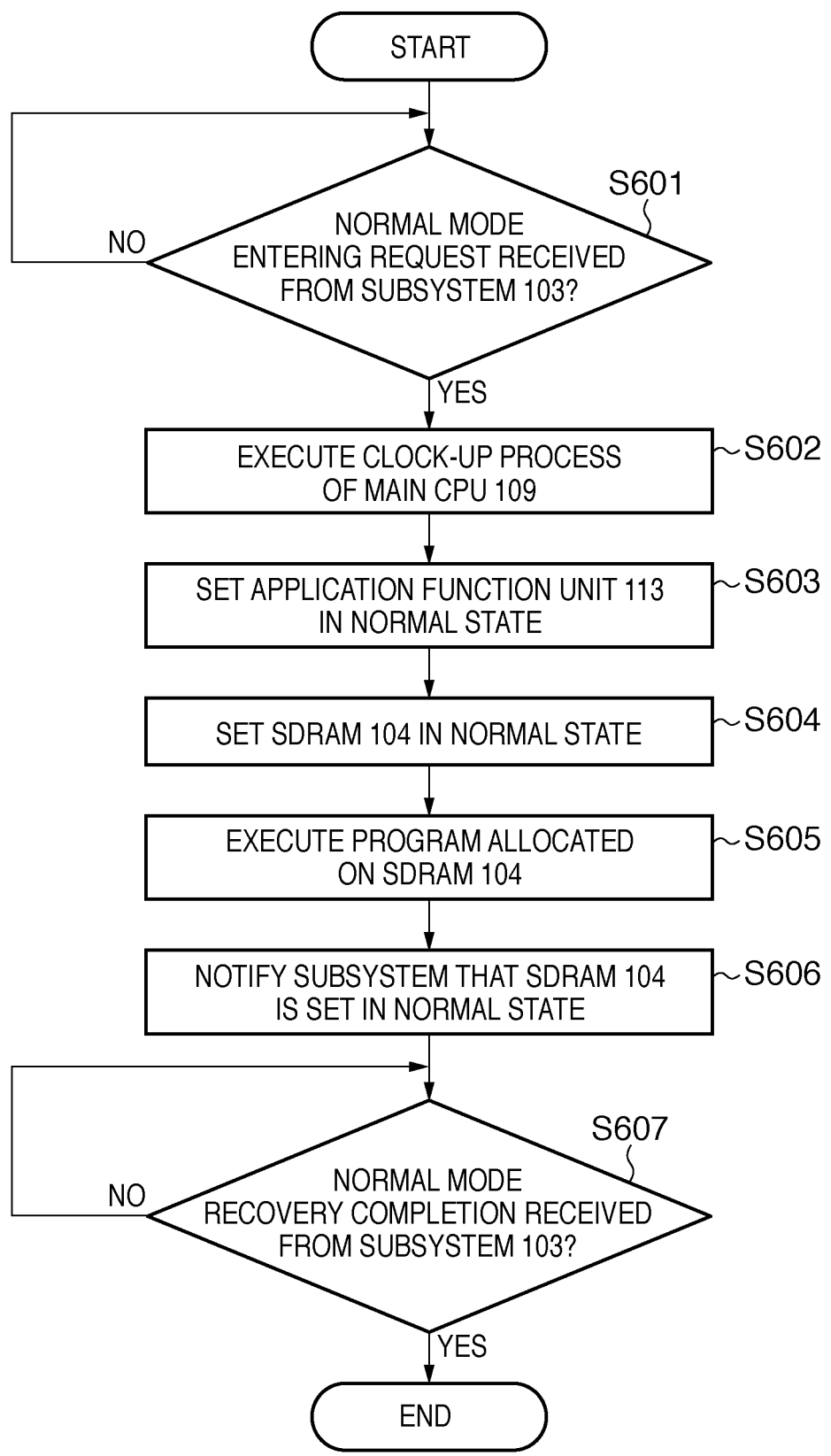
FIG. 6 is a flowchart showing an example of the operation of the main system 102 upon recovering to the normal mode according to the first embodiment of the present invention.

Details of the processes of the main system 102 and subsystem 103 at that time will be described below. FIG. 6 is a flowchart when the main system 102 recovers from the power saving mode to the normal mode. A program including steps S601 to S604 of the processing shown in FIG. 6 is allocated on the SRAM 107, and a program including steps S605 to S607 is allocated on the SDRAM 104. Both the programs are executed by the main CPU 109.

Upon reception of the normal mode recovery request from the subsystem 103 in step S601, the main system 102 executes a clock-up process of the main CPU 109 in step S602, and sets the application function unit in the normal state in step S603. Then, the main system 102 restores the SDRAM 104 at the self refresh mode to the normal state to allow access to the SDRAM 104 in step S604.

When the main system 102 can access the SDRAM 104, it starts execution of the program allocated on the SDRAM in step S605. The main system 102 notifies the subsystem 103 that the SDRAM 104 is set in the normal state in step S606.

After that, the main system 102 waits for a normal mode entering completion notification message from the subsystem 103 in step S607. Upon reception of the normal mode entering completion notification message from the subsystem 103 in step S607, the main system 102 executes the normal mode program, and the multiprocessor system 101 completes recovery to the normal mode.

Figure 7:
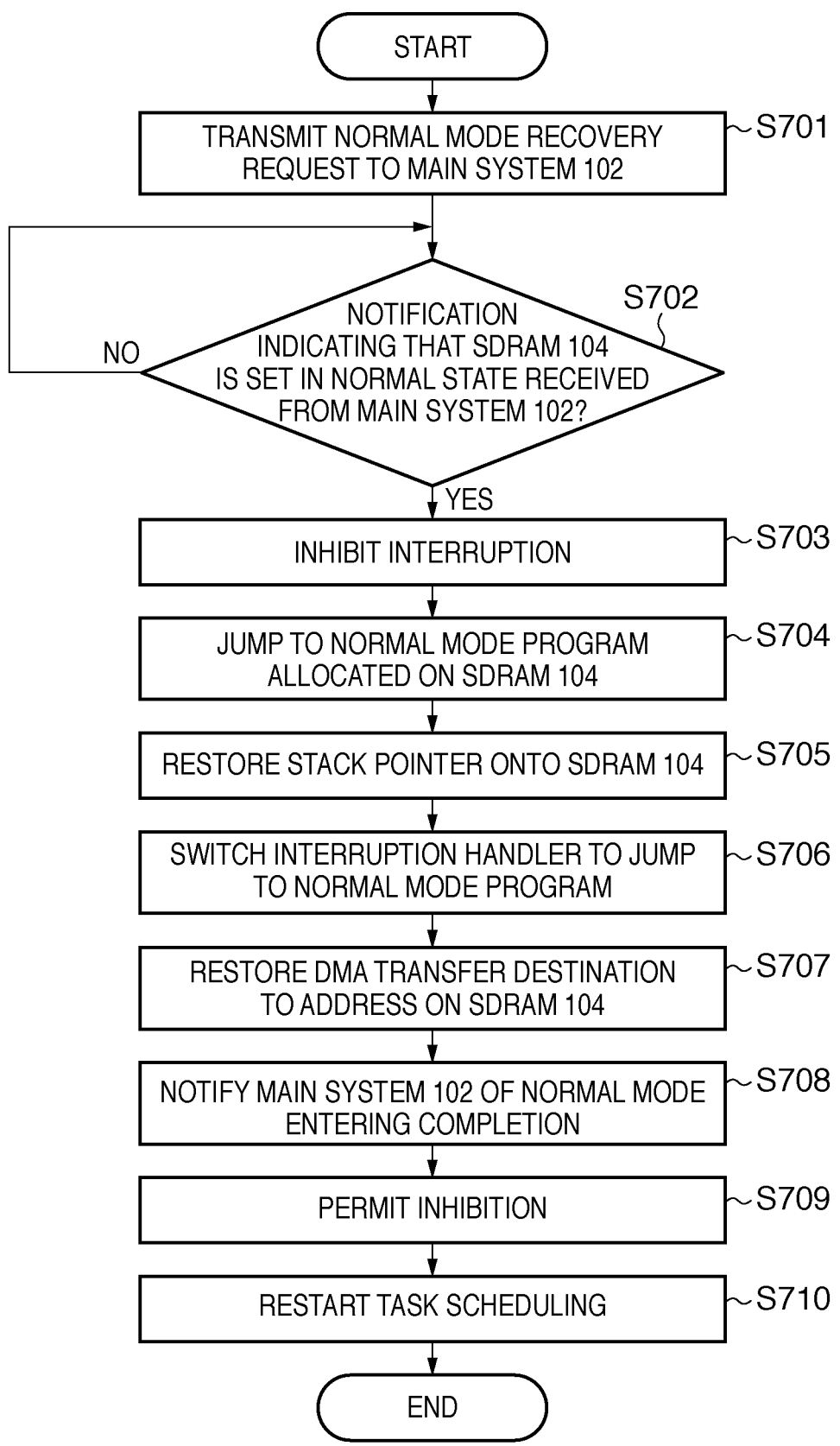
FIG. 7 is a flowchart showing an example of the operation of the subsystem 103 upon recovering to the normal mode according to the first embodiment of the present invention.

FIG. 7 is a flowchart when the subsystem 103 recovers from the power saving mode to the normal mode. The processes of steps S701 to S704 are allocated on the SRAM 108, and the processes of steps S705 to S710 are allocated on the SDRAM 104. These processes are also continuously executed in the switching task.

When the subsystem 103 receives a predetermined packet at the power saving mode and the recovery condition to the normal mode is satisfied, the subsystem 103 transmits the normal mode recovery request to the main system 102 in step S701. After that, the subsystem 103 waits for a notification indicating that the SDRAM 104 is set in the normal state from the main system 102 in step S702.

Upon reception of the notification indicating that the SDRAM 104 is set in the normal state from the main system 102 in step S702, the subsystem 103 switches to execution using the program and data allocated on the SDRAM 104 in steps S703 to S707.

In step S703, the subsystem 103 inhibits interruptions associated with the inter-CPU communication register 105 and communication unit 111. After that, the subsystem 103 jumps from the program allocated on the SRAM 108 to that allocated on the SDRAM 104 or calls a function in step S704.

Subsequently, in step S705 the subsystem 103 restores the stack pointer to the address on the SDRAM 104 saved at the time of the power saving mode entering processing. Furthermore, the subsystem 103 switches the interruption handler from the inter-CPU communication register 105 and communication unit 111 to jump to the normal mode program in step S706, and restores the DMA transfer destination of the communication unit 111 to the area on the SDRAM 104 in step S707. The subsystem 103 temporarily stops DMA transfer as needed upon changing the DMA transfer destination. Then, the subsystem 103 completes communication preparation of the communication unit 111, and can implement switching control of its access destination from the SRAM 108 to the SDRAM 104.

Upon completion of these switching processes, the subsystem 103 notifies the main system 102 of completion of the normal mode recovery processing in step S708.

The subsystem 103 permits interruptions of the inter-CPU communication register 105 and communication unit 111 in step S709, so as to restart communications of the communication unit 111. Furthermore, in step S710 the subsystem 103 enables task scheduling of the embedded OS. As a result, the switching task completes its processing, and another task is executed. Thus, the normal mode is recovered, and processing at the normal mode is restarted.

Second Embodiment

The system block diagram according to the second embodiment of the present invention is shown in FIG. 1 as in the first embodiment. Differences between the second and first embodiments lie in the processing of the subsystem 103 upon entering the power saving mode from the normal mode and that of the subsystem 103 upon entering the normal mode from the power saving mode. The exchange sequences between the main system 102 and subsystem 103 and the processing of the main system 102 are the same as those in the first embodiment.

Processing executed when the subsystem 103 enters the power saving mode from the normal mode, and then recovers from the power saving mode to the normal mode after reception of a predetermined packet at the power saving mode will be explained below. Note that a description of the same processes as in the first embodiment will not be repeated.

Figure 8:
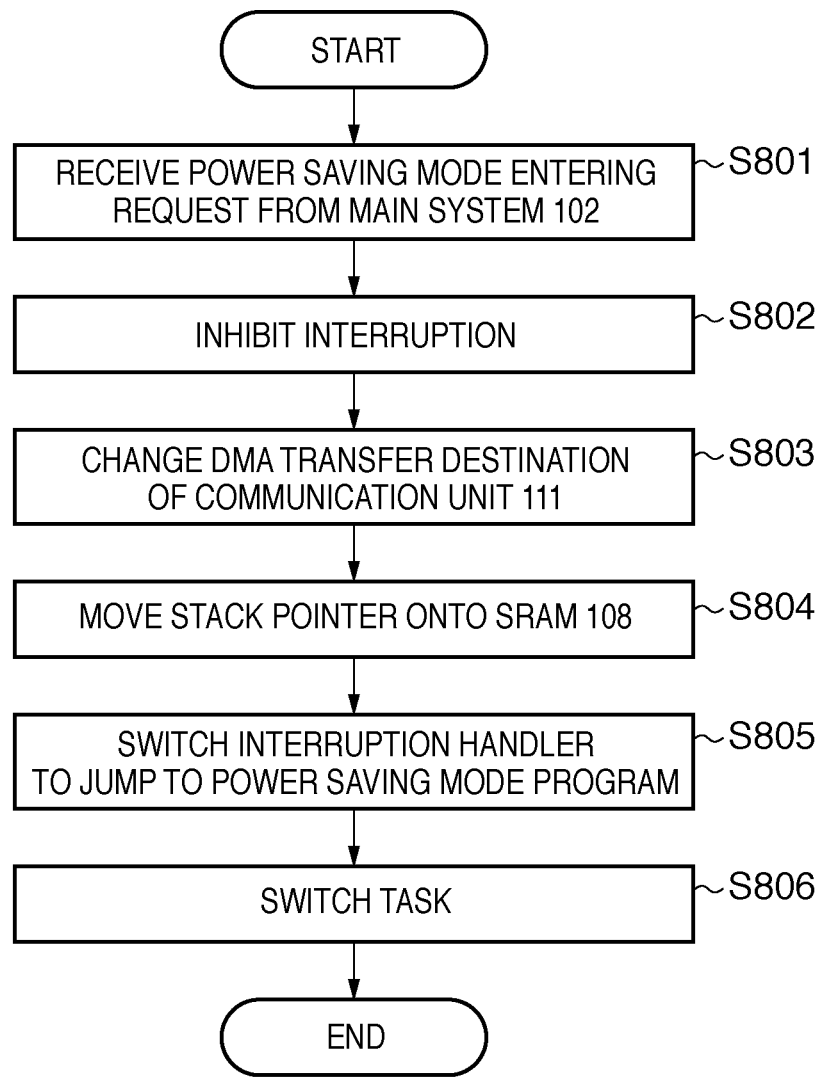
FIG. 8 is a flowchart showing an example of the operation of an entering task of the subsystem 103 according to the second embodiment of the present invention.
Figure 9:
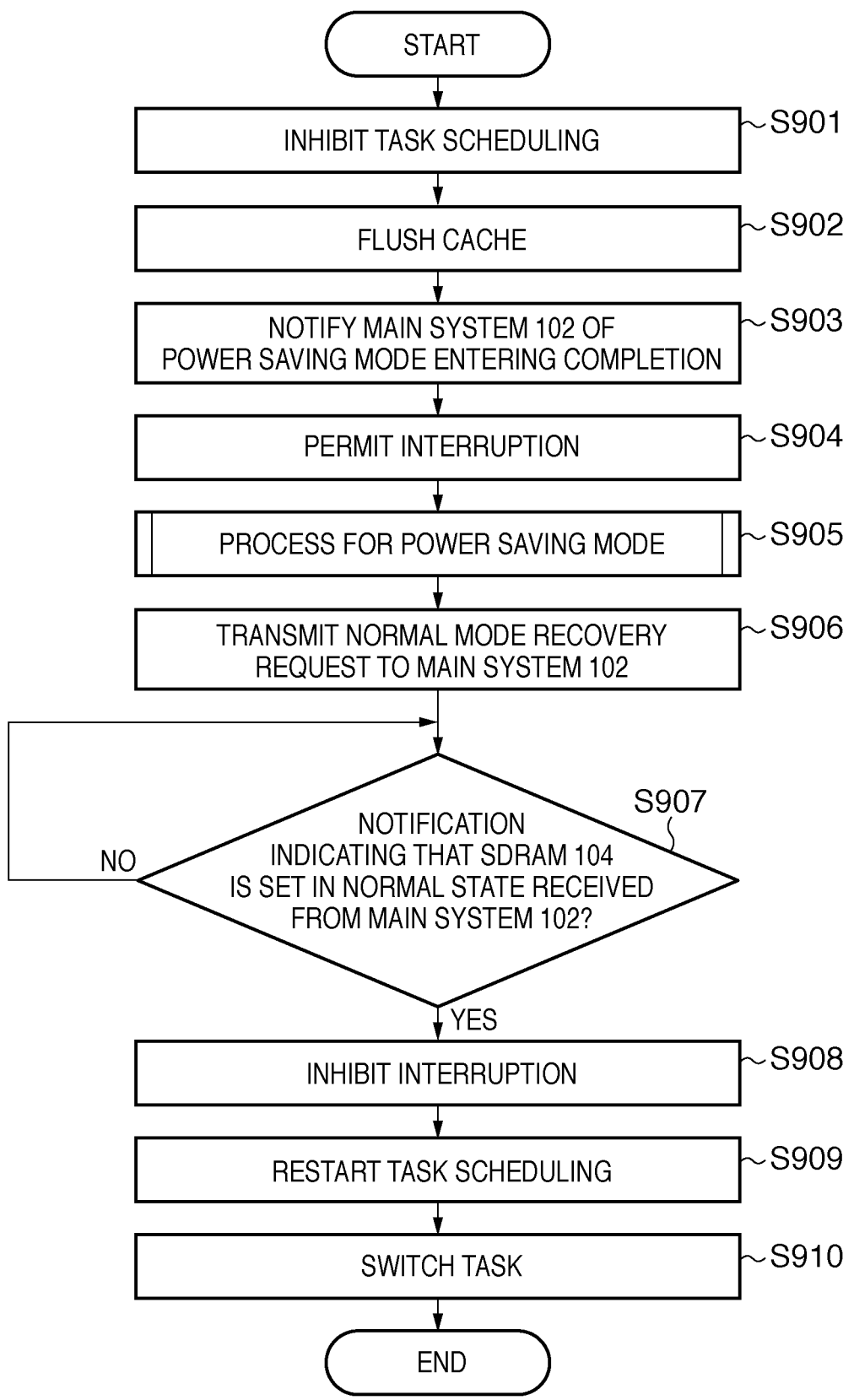
FIG. 9 is a flowchart showing an example of the operation of a power saving mode task of the subsystem 103 according to the second embodiment of the present invention.

Power saving mode entering processing, processing at the power saving mode, and normal mode recovery processing in the subsystem 103 are respectively executed by an entering task, power saving mode task, and recovery task. FIGS. 8, 9, and 10 are flowcharts of these tasks. The entering task and recovery task are allocated on the SDRAM 104, and the power saving mode task is allocated on the SRAM 108.

Upon entering the power saving mode from the normal mode, the subsystem 103 executes the entering task. The flowchart of the entering task will be described below with reference to FIG. 8.

The subsystem 103 receives a power saving mode entering request via the inter-CPU communication register 105 in step S801. The processes of steps S802 to S805 are the same as those of steps S403 to S406 in the first embodiment.

After the processes until step S805, the subsystem 103 switches a task to be executed from the entering task to the power saving mode task in step S806 so as to start execution of the program allocated on the SRAM 108. The power saving mode task is allocated on the SRAM 108.

The processing after the task to be executed is switched to the power saving mode task will be described below with reference to the flowchart shown in FIG. 9. In step S901, the power saving mode task inhibits tasks allocated on the SDRAM 104 from being dispatched by, for example, stopping a task scheduling function of the embedded OS or sufficiently raising priority of the power saving mode task.

In step S902, the power saving mode task flushes the cache and waits long enough until the cache is flushed. In this way, accesses to the SDRAM 104 can be stopped. After accesses to the SDRAM 104 can be stopped, the power saving mode task sends a normal mode entering completion notification message to the main system in step S903.

As the last process of the power saving mode entering processing, the power saving mode task permits interruptions of the inter-CPU communication register 105 and communication unit 111 in step S904. Then, as in the first embodiment, the communication unit 111 can restart packet reception, thus completing the power saving mode entering processing. The multiprocessor system 101 executes processing as the power saving mode.

At the power saving mode, the power saving mode task executed by the subsystem 103 waits for reception of a predetermined packet in step S905. Upon reception of the predetermined packet from the communication unit 111 via the network 112, the power saving mode task executes recovery processes from the power saving mode to the normal mode.

The recovery processes will be explained from step S906 in FIG. 9. These processes are continuously executed by the power saving mode task. After reception of the predetermined packet, the power saving mode task transmits a normal mode recovery request to the main system 102 in step S906. After that, the subsystem 103 waits for a notification indicating that the SDRAM 104 is set in the normal state from the main system 102 in step S907.

After reception of the notification, the subsystem 103 inhibits interruptions associated with the inter-CPU communication register 105 and communication unit 111 in step S908. After that, the subsystem 103 restarts task scheduling in step S909, and switches a task to the recovery task in step S910.

The sequel of the recovery processes to the normal mode will be described below with reference to FIG. 10. FIG. 10 is a flowchart of the processes of the recovery task. The recovery task is allocated on the SDRAM 104.

The processes of the recovery task, that is, the processes from step S1001 to step S1005, are the same as those of steps S705 to S709 in the first embodiment. The recovery task executes the processes until step S1005 to complete its processes, and another task is executed, thus restarting the normal mode program. Then, the multiprocessor system 101 completes recovery to the normal mode.

In place of the arrangement shown in FIG. 1 used in the first and second embodiments, the SRAM 108 and subsystem 103 may be connected so as to connect the SRAM 107 to the main system 102. In this case, since the SRAM 108 need not be connected to the shared bus between the main system 102 and subsystem 103, electric power at the power saving mode can be further reduced.

According to the aforementioned embodiments, when the multiprocessor/multicore system enters the power saving mode, the shared memory can be set in the power saving state without causing any unauthorized accesses to the shared memory and any data inconsistency in the shared memory. Upon entering the normal mode as well, accesses to the shared memory can be restarted without causing any unauthorized accesses to the shared memory and any data inconsistency in the shared memory.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An apparatus comprising:
a first system comprising a first processor;
a second system comprising a second processor;
a first memory which the first system and the second system access; and
a second memory which the second system accesses,
wherein the second system which accesses the first memory and the second memory in a case where the apparatus is in a first state, restricts access of the first memory and accesses the second memory in a case where the apparatus is in a second state in which a power consumption by the apparatus is lower than that in the first state,
wherein when the apparatus receives a predetermined packet from an external apparatus in a case where the apparatus is in the second state, the apparatus shifts to the first state from the second state, and
wherein after restricting the access to the first memory, the second system sends a predetermined report to the first system.

2. The apparatus according to claim 1, wherein, in a case that the apparatus enters the second state, both of the first system and the second system stop accesses to the first memory.

3. The apparatus according to claim 1, wherein, in a case that the apparatus enters the second state, operation of the first memory stops.

4. The apparatus according to claim 3, wherein the second system determines whether or not to cancel the second state of the apparatus, and, in a case that the second system determines to cancel the second state, the second system sends to the first system a signal for releasing the first memory from operation stop status.

5. The apparatus according to claim 1, wherein the second system determines whether or not to cancel the second state of the apparatus based on the packet received from the external apparatus.

6. The apparatus according to claim 1, wherein, in a case that the second state of the apparatus is canceled, the second system accesses to the first memory.

7. The apparatus according to claim 1, further comprising a relay unit configured to relay a communication between the first system and the second system.

8. The apparatus according to claim 1, wherein, in a case that the apparatus enters the second state, the second system inhibits a program on the first memory from being dispatched.

9. The apparatus according to claim 1, wherein, in a case that the apparatus enters the second state, the second system inhibits a program on the first memory from being dispatched and then starts execution of a program stored on the second memory.

10. The apparatus according to claim 1, wherein, in a case that the apparatus enters the second state, the second system starts execution of a program on the second memory and then inhibits a program on the first memory from being dispatched.

11. The apparatus according to claim 1, wherein, in a case that the apparatus enters the second state, the second system raises priority of a program on the second memory to be higher than priority of a program on the first memory.

12. The apparatus according to claim 1, wherein, in a case that the apparatus enters the second state, the second system stops scheduling required to decide an execution order of programs to be executed by the second system.

13. The apparatus according to claim 1, wherein, in a case that the apparatus enters the second state, the second system flushes a cache in the second system.

14. A method for controlling an apparatus comprising, a first system comprising a first processor, a second system comprising a second processor, a first memory which the first system and the second system access, and a second memory which the second system accesses, said method comprising step of:
the second system which accesses the first memory and the second memory in a case where the apparatus is in a first state, restricting access of the first memory and accessing the second memory in a case where the apparatus is in a second state in which a power consumption by the apparatus is lower than that in the first state,
wherein when the apparatus receives a predetermined packet from an external apparatus in a case where the apparatus is in the second state, the apparatus shifts to the first state from the second state, and
wherein after restricting the access to the first memory, the second system sends a predetermined report to the first system.

15. A non-transitory computer readable storage medium storing a computer program which causes an apparatus to execute a method for controlling the communication apparatus comprising, a first system comprising a first processor, a second system comprising a second processor, a first memory which the first system and the second system access, and a second memory which the second system accesses, said method comprising step of:
the second system which accesses the first memory and the second memory in a case where the apparatus is in a first state, restricting access of the first memory and accessing the second memory in a case where the apparatus is in a second state in which a power consumption by the apparatus is lower than that in the first state,
wherein when the apparatus receives a predetermined packet from an external apparatus in a case where the apparatus is in the second state, the apparatus shifts to the first state from the second state, and
wherein after restricting the access to the first memory, the second system sends a predetermined report to the first system.

16. The apparatus according to claim 1, wherein in a case where the apparatus enters the second state, a power supply to the first memory stops.

17. The apparatus according to claim 1, wherein the apparatus enters the second state according to an instruction from the first system.

18. The apparatus according to claim 1, wherein in a case where the apparatus enters the second state, the first memory enters a self refresh mode.

19. The apparatus according to claim 1, wherein the second system which accesses the first memory and the second memory when the apparatus is in the first state, does not access the first memory and accesses the second memory in a case where the system enters the second state until processing for recovering to the first state starts.

20. The apparatus according to claim 1, wherein the first system implements an application function with the first processor.

21. The apparatus according to claim 20, wherein the application function is a print function.

22. The apparatus according to claim 1, wherein the second system further comprising a communication unit configured to communicate with the external apparatus,
wherein the second processor communicates with the external apparatus via the communication unit.

23. The apparatus according to claim 1, wherein the second system stops an access to the first memory in response to a predetermined instruction from the first system.

24. The apparatus according to claim 23, wherein the first system outputs the predetermined instruction when the apparatus shifts to the second state from the first state.

* * * * *